(12) United States Patent
Dalsgaard et al.

(10) Patent No.: US 10,231,222 B2
(45) Date of Patent: Mar. 12, 2019

(54) METHOD AND APPARATUS FOR HANDLING CARRIER AGGREGATION AND RELATED SIGNALING

(71) Applicant: Nokia Technologies Oy, Espoo (FI)

(72) Inventors: Lars Dalsgaard, Oulu (FI); Ilkka Keskitalo, Oulu (FI); Jarkko Koskela, Oulu (FI); Jorma Kaikkonen, Oulu (FI); Jussi-Pekka Koskinen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 201 days.

(21) Appl. No.: 14/909,428

(22) PCT Filed: Aug. 19, 2013

(86) PCT No.: PCT/US2013/055586
§ 371 (c)(1),
(2) Date: Feb. 1, 2016

(87) PCT Pub. No.: WO2015/026316
PCT Pub. Date: Feb. 26, 2015

(65) Prior Publication Data
US 2016/0198439 A1    Jul. 7, 2016

(51) Int. Cl.
*H04W 72/04*    (2009.01)
*H04L 5/00*    (2006.01)
*H04W 48/20*    (2009.01)

(52) U.S. Cl.
CPC .......... *H04W 72/042* (2013.01); *H04L 5/001* (2013.01); *H04L 5/006* (2013.01); *H04L 5/0032* (2013.01);
(Continued)

(58) Field of Classification Search
None
See application file for complete search history.

(56) References Cited

U.S. PATENT DOCUMENTS 8,798,100 B2 *   8/2014   Kang ................... H04L 1/0027
                                                          370/310.2
9,642,114 B2 *   5/2017   Fong ...................... H04W 4/70
(Continued)

FOREIGN PATENT DOCUMENTS

KR   20120023514        3/2012
KR   20120023514 A  *   3/2012    ........ H04W 72/0453

OTHER PUBLICATIONS

International Search Report and Written Opinion received for corresponding Patent Cooperation Treaty Application No. PCT/US2013/055586, dated May 16, 2014, 11 pages.
(Continued)

*Primary Examiner* — Chi H Pham
*Assistant Examiner* — Vladislav Y Agureyev
(74) *Attorney, Agent, or Firm* — Squire Patton Boggs (US) LLP

(57) ABSTRACT

A method and apparatus can be configured to receive, by the apparatus, a configuration for a carrier. The carrier deploys at least one cell to be used for carrier aggregation. The method can also include detecting the at least one cell. The method can also include determining that the at least one cell is a secondary cell for carrier aggregation based on the at least one cell being detected.

15 Claims, 5 Drawing Sheets

(52) U.S. Cl.
CPC ........... *H04L 5/0098* (2013.01); *H04W 48/20* (2013.01); *H04L 5/005* (2013.01); *H04L 5/0023* (2013.01)

(56) References Cited

U.S. PATENT DOCUMENTS

| | | | |
|---|---|---|---|
| 2009/0316659 A1 | 12/2009 | Lindoff et al. | |
| 2011/0317552 A1* | 12/2011 | Lee | H04L 5/001 370/228 |
| 2013/0136027 A1* | 5/2013 | Matsuo | H04W 24/10 370/252 |
| 2013/0136094 A1* | 5/2013 | Wei | H04W 52/0203 370/329 |
| 2013/0223321 A1* | 8/2013 | Lee | H04W 72/0453 370/312 |
| 2013/0272233 A1* | 10/2013 | Dinan | H04W 72/0406 370/329 |
| 2013/0322389 A1* | 12/2013 | Maeda | H04L 5/001 370/329 |
| 2013/0331077 A1* | 12/2013 | Mucke | H04W 76/06 455/418 |
| 2014/0029514 A1* | 1/2014 | Yu | H04W 24/10 370/328 |
| 2014/0204791 A1* | 7/2014 | Teng | H04W 16/14 370/252 |
| 2014/0307623 A1* | 10/2014 | Gheorghiu | H04W 76/026 370/328 |
| 2015/0189627 A1* | 7/2015 | Yang | H04L 5/0098 370/280 |
| 2015/0195062 A1* | 7/2015 | Hwang | H04L 1/1607 370/329 |
| 2015/0319778 A1* | 11/2015 | Folke | H04W 48/20 370/330 |
| 2017/0196005 A1* | 7/2017 | Yang | H04W 72/0413 |

OTHER PUBLICATIONS

Ericsson et al "Summary of the email discussion [68#23] LTW: CC Activation deactiviation", 3rd generation Partnership Project (3GPP), Mobile Competence Centre; 650 Route Des Lucioles; F-06921 Sophia-Antipolis Cedex; France, vol. RAN Wg2, No. Valencia, Spain; Jan. 18, 2010-Jan. 22, 2010, Jan. 11, 2010.

* cited by examiner

METHOD AND APPARATUS FOR HANDLING CARRIER AGGREGATION AND RELATED SIGNALING

RELATED APPLICATION

This application was originally filed as PCT Application No. PCT/US2013/055586 filed Aug. 19, 2013.

BACKGROUND

Field

Embodiments of the invention relate to handling carrier aggregation and related signaling.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method comprises receiving, by a user equipment, a configuration for a carrier. The carrier deploys at least one cell to be used for carrier aggregation. The method also includes detecting the at least one cell. The method also includes determining that the at least one cell is a secondary cell for carrier aggregation based on the at least one cell being detected.

In the method of the first embodiment, the determining comprises determining that the at least one cell is an activated secondary cell if the at least once cell is detected.

In the method of the first embodiment, the method can further include monitoring a physical-downlink-control channel of the at least one cell.

In the method of the first embodiment, detecting the at least one cell comprises detecting at least one small cell.

In the method of the first embodiment, the monitoring the physical-downlink-control channel comprises monitoring the physical-downlink-control-channel if a cell-reference-signal-reference power and/or a reference-signal-received-quality exceeds a given threshold.

In the method of the first embodiment, the method can further include receiving, by the user equipment, an indication that the configuration for the carrier is for a secondary carrier.

According to a second embodiment, an apparatus comprises at least one processor. The apparatus can also include at least one memory including computer program code. The at least one memory and the computer program code can be configured, with the at least one processor, to cause the apparatus at least to receive, by the apparatus, a configuration for a carrier. The carrier deploys at least one cell to be used for carrier aggregation. The apparatus can also be caused to detect the at least one cell. The apparatus can also be caused to determine that the at least one cell is a secondary cell for carrier aggregation based on the at least one cell being detected.

In the apparatus of the second embodiment, the determining comprises determining that the at least one cell is an activated secondary cell if the at least once cell is detected.

In the apparatus of the second embodiment, the apparatus can be further caused to monitor a physical-downlink-control channel of the at least one cell.

In the apparatus of the second embodiment, detecting the at least one cell comprises detecting at least one small cell.

In the apparatus of the second embodiment, the monitoring the physical-downlink-control channel comprises monitoring the physical-downlink-control-channel if a cell-reference-signal-reference power and/or a reference-signal-received-quality exceeds a given threshold.

In the apparatus of the second embodiment, the apparatus is further caused to receive an indication that the configuration for the carrier is for a secondary carrier.

According to a third embodiment, a computer program product can be embodied on a non-transitory computer readable medium. The computer program product can be configured to control a processor to perform a process. The process can include receiving, by a user equipment, a configuration for a carrier. The carrier deploys at least one cell to be used for carrier aggregation. The process can also include detecting the at least one cell. The process can also include determining that the at least one cell is a secondary cell for carrier aggregation based on the at least one cell being detected.

In the computer program product of the third embodiment, the determining comprises determining that the at least once cell is an activated secondary cell if the at least one cell is detected.

In the computer program product of the third embodiment, the process further comprises monitoring a physical-downlink-control channel of the at least one cell.

In the computer program product of the third embodiment, detecting the at least one cell comprises detecting at least one small cell.

In the computer program product of the third embodiment, the monitoring the physical-downlink-control channel comprises monitoring the physical-downlink-control-channel if a cell-reference-signal-reference power and/or a reference-signal-received-quality exceeds a given threshold.

In the computer program product of the third embodiment, the process further comprising receiving, by the user equipment, an indication that the configuration for the carrier is for a secondary carrier.

According to a fourth embodiment, a method can comprise transmitting a configuration for a carrier to a user equipment. The carrier deploys at least one cell to be used for carrier aggregation. The at least one cell is determined to be a secondary cell for carrier aggregation based on the at least one cell being detected by the user equipment.

In the method according to the fourth embodiment, the method can further comprise transmitting, to the user equipment, an indication that the configuration for the carrier is for a secondary carrier.

According to a fifth embodiment, an apparatus comprises at least one processor. The apparatus can also include at least one memory including computer program code. The at least one memory and the computer program code can be configured, with the at least one processor, to cause the apparatus at least to transmit a configuration for a carrier to a user equipment. The carrier deploys at least one cell to be used for carrier aggregation. The at least one cell is determined to be a secondary cell for carrier aggregation based on the at least one cell being detected by the user equipment.

In the apparatus of the fifth embodiment, the apparatus is further caused to transmit, to the user equipment, an indication that the configuration for the carrier is for a secondary carrier.

According to a sixth embodiment, a computer program product can be embodied on a non-transitory computer readable medium. The computer program product can be configured to control a processor to perform a process. The process can include transmitting a configuration for a carrier to a user equipment. The carrier deploys at least one cell to be used for carrier aggregation. The at least one cell is determined to be a secondary cell for carrier aggregation based on the at least one cell being detected by the user equipment.

In the computer program product of the sixth embodiment, the process can further comprise transmitting, to the user equipment, an indication that the configuration for the carrier is for a secondary carrier.

BRIEF DESCRIPTION OF THE DRAWINGS

For proper understanding of the invention, reference should be made to the accompanying drawings, wherein.

DETAILED DESCRIPTION

Figure 1:
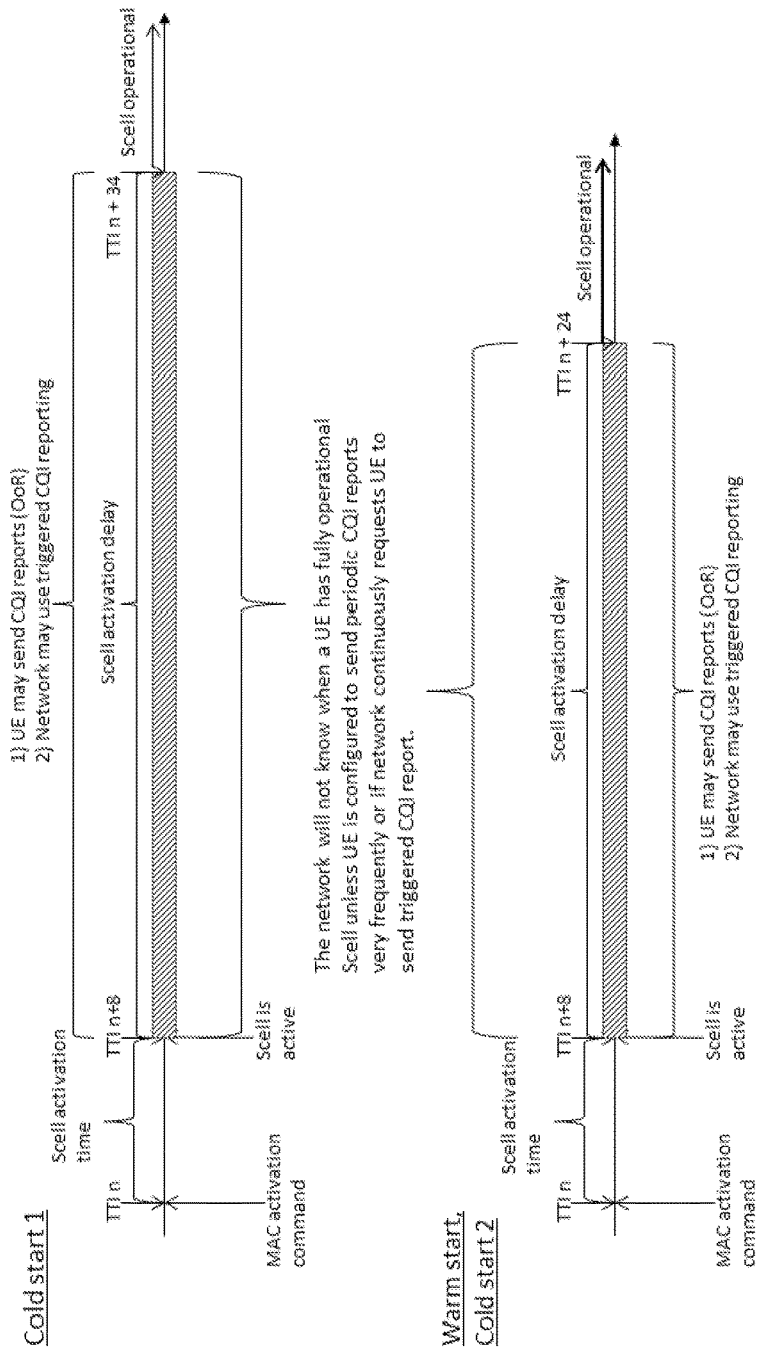
FIG. 1 illustrates secondary-cell activation delay.

Embodiments of the present invention address the operation of offloading of traffic and the operation of carrier aggregation.

In order to satisfy increasing demand for higher network capacity and for improved spectrum efficiency, advanced network-deployment principles will be developed. One of the approaches for increasing network capacity and for improving spectrum efficiency is directed at providing efficient data transfer in mobile networks. This approach increases the use of small cells for data offloading. Specifically, while macro cells provide a "coverage" layer with seamless cellular coverage and mobility, small cells can be used to take a large portion of traffic away from the macro cells. These small cells can be placed in areas where traffic hotspots are identified and/or anticipated. Such areas can include, for example, shopping malls, city centers, and/or sporting arenas.

Evolved Universal Terrestrial Radio Access Network (E-UTRAN) Release 10 describes how multiple carriers can be used simultaneously (also known as carrier aggregation (CA)) in order to increase data rates. Carrier aggregation (CA) can be used as a single-site enhancement for co-located deployment, for example. In addition to increasing data rates, the application of CA can also improve/simplify network operation and improve flexibility for data offloading between macro cells and small cells. To achieve these improvements, there are ongoing discussions in RAN2 about dual connectivity where CA component carriers (CCs) are not necessarily from the same site/evolved-Node-B (eNB) (as illustrated by non-co-located deployment or inter-site CA).

In general, there are two ways to implement small-cell deployments. One way is to use the aforementioned methods of carrier aggregation (CA) (which can be applied to UEs that support CA). Another way is to use normal mobility procedures to enable load balancing and offloading (which can be applied to all UEs, regardless of whether they support CA).

In the previous approaches that use methods of CA, the typical method of using CA will rely on the use of existing, standard inter-frequency measurement operations (such as operations directed to measurement configuration, cell detection/measurement performance, and measurement reporting). During the course of performing these standard inter-frequency measurement operations, inter-frequency small-cell detection is performed by a user equipment (UE). If a small-cell is detected (a small-cell that may be suitable for CA) by the UE, the UE then reports the detection of the small-cell to an evolved Node B (eNB). The UE necessarily reports the detection to the eNB before the small cell can be configured as a secondary cell. In other words, before the small cell can be activated as a secondary cell for CA, the reporting must first occur. There is generally no specified behavior for blind detection in cases where the UE cannot detect an activated secondary cell. Also for non-CA use cases, the inter-frequency cell detection and measurements are based on the methods described above.

As described above, in the previous approaches, small-cell discovery, secondary-cell configuration, and secondary-cell activation are based on normal measurement configuration and measurement reporting. Small-cell discovery and secondary-cell activation are then enhanced with secondary-cell configuration. The issues to address in offloading include: (1) ensuring the reliable detection of smalls cells (the detection can be performed via inter-frequency measurements, for example), (2) the adjusting of mobility parameters so that UEs will trigger measurement reporting at a suitable/best time (and without triggering too often), and (3) enabling configuration of the secondary cell in a timely manner. Configuration of the secondary cell is then followed by a medium-access-control level (MAC level) activation command that can be triggered by having (a large amount of) data to be transmitted.

One of the current issues in the related technology relates to determining how to enable use of the small cells, while preventing fast-moving UEs from entering and/or using the small cells. Most radio link failures (RLFs) experienced by UEs occur during outbound handover (HO) from a small cell to a macro cell. In CA deployment, similar problems occur with fast-moving UEs. In view of the possibility of experiencing RLF during outbound handover, a UE that is moving at a fast velocity will probably not derive much benefit from being configured with a secondary cell.

Many of the problems identified in a heterogeneous network (HetNet) are likely also present in CA and secondary-cell operations. Of course, with secondary-cell operations, the problems do not lead to handover failures nor RLF, per se, because neither handover failures nor RLF are specifically defined for secondary-cell operations. However, the problems encountered within CA and secondary-cell operations can result in a high signaling load, without any attendant benefits.

There has been ongoing work in 3GPP RAN4 Working Group (WG) concerning the secondary-cell activation times. Secondary-cell activation can take up to 34 ms. FIG. 1 illustrates the current Scell activation delays.

3GPP RAN4 WG recently addressed the issue of reporting the status (in addition to a network option of using CQI (Channel Quality Indication) reporting) of the configured/activated secondary cell to the network when the configuration and/or activation is done in a blind manner. Performing configuration and/or activation is considered to be blind when the network has no knowledge of whether the UE has detected/measured the configured secondary cell.

As also discussed in the Enhancements for Diverse Data Applications (EDDA) Work Item (WI), the future will likely provide more smart phones which will likely be online in a more continuous manner, while not creating large, continuous data transmissions. These smart phones will likely perform small-data transmissions more frequently. These types of more frequent small-data-packet transmissions will probably not significantly benefit from the features enabled by CA.

In view of the above, the previous approaches and the technology related to the previous approaches are generally directed at enabling "smart" usage (usage that occurs when needed) and fast usage of small cells for UEs (usage that occurs at a suitable speed), without adding excessive signaling burden.

According to the above-described previous approaches, for some scenarios, such as densely-deployed scenarios of inter-site CA with moving UEs, the signaling related to configuration, activation, deactivation, and deconfiguration (plus the necessary measurement configuration and reporting) related to CA operation can significantly increase the amount of control signaling. A large amount of control signaling can be burdensome. Further, continuous CA configuration, e.g., for smart phones, may not be beneficial from a system-level perspective nor from the UE's point of view. In other words, with the previous approaches, there may be a large-signaling overhead with no attendant benefits.

To elaborate upon and outline the differences between the behavior of the previous approaches and the embodiments of the present invention, the previous approaches for CA activation are described first below.

According to the previous approaches for CA activation, a network configures a UE with inter-frequency measurements (on the carrier on which the secondary cells are deployed). The UE then performs inter-frequency measurements. If the UE can detect a secondary cell and perform measurements of the secondary cell, the UE reports this to the network using normal reporting (the normal reporting can be triggered by event-based triggering). The network then sends CA configuration for configuring the secondary cells. The secondary cells can be activated by use of a MAC command, for example. As described above, before the secondary cells are configured/activated, the UE will generally first perform the reporting of the aforementioned detection to the network in order to have more reliable performance. When a secondary cell is activated, the UE starts performing actions defined and required for an activated cell, and the UE can most likely be scheduled on the secondary cell after a given secondary-cell activation delay has elapsed.

The above-described procedure of the previous approaches can also work in conjunction with Scenario #2 from Small Cell Enhancements (SCE) and with related signaling as follows. Scenario #2 generally refers to the ongoing work in 3GPP. This ongoing work describes 3 scenarios. In scenario #1, small cells and macro cells are deployed on a same carrier. In scenario #2, small cells are deployed on another carrier than the macro cells (another frequency). In scenario #3, small cells are deployed on a carrier where there is no coverage from a macro cell (any).

The UE can be configured with inter-frequency measurements for the carrier(s) on which the potential secondary-cell candidates are deployed. The UE can also be configured with appropriate events in order to ensure that the UE will inform the network when a potential secondary cell is detected (e.g., the event may be an event A4). Event A4 generally describes the event when a neighbor cell (with a same or different carrier/frequency) is better than a given threshold. The threshold can be a reference-signal-received-quality (RSRQ) or a reference-signal-received-power (RSRP) threshold, for example.

The network can then configure the secondary cell using a secondary-cell configuration message. However, as described above, before the secondary cell can be configured, the network will (in most cases) be informed (by the UE) that the secondary cell has been detected. The UE can then start to follow secondary-cell measurement rules for the configured secondary cell. If the configured secondary cell is never used, the network may, at some point, de-configure the secondary cell (but this de-configuring is not mandatory). If the secondary cell is planned to be used, the network will generally activate the secondary cell using a secondary-cell-activation MAC command. The UE then activates (regards the Scell as being activated) the secondary cell. The network may schedule the UE on both a primary cell and a secondary cell. When the secondary cell is no longer needed for scheduling, the network may de-activate the secondary cell. If the UE leaves the coverage of the detected secondary cell, the UE will likely need to send a new measurement report to the network (e.g., an event A4 that indicates leaving).

Previous approaches are described in 3GPP studies and in related contributions relating to heterogeneous-network (HetNet) mobility. Previous approaches are also described in small-cell studies (such as in Release 12) and in particular contributions on dual connectivity. The previous approaches are also described in current 3GPP specifications on mobility (specifications that describe Radio-Resource-Control (RRC), for example) and CA. 3GPP Technical Specification 36.133 describes minimum performance requirements for UE.

In view of the above, embodiments of the present invention present improvements in the handling of carrier aggregation and in the related signaling. In embodiments of the present invention, CA is enabled by configuring a UE with a carrier that is used for deploying the potential cells to be used for carrier aggregation. The potential cells to be used for carrier aggregation can be secondary cells. Once a cell on such a carrier has been detected, this cell can be treated as an activated secondary cell, and the UE can begin to monitor the secondary cell's Physical-Downlink-Control-Channel (PDCCH). In other words, in contrast with the previous approaches, one embodiment of the present invention allows the UE to consider the detected cell as an activated secondary cell without needing the UE to first report the detection to the network. When the UE monitors the PDCCH, the monitoring could be governed by additional threshold(s). For example, the UE may monitor the secondary cell's PDCCH only after the detected secondary cell's quality is good enough (e.g., the detected secondary cell's quality is better than a set threshold).

Additional, in embodiments of the present invention, an eNB (corresponding to the secondary cell) may configure the Scell directly from the secondary cell.

Embodiments of the present invention can be implemented by UEs that are capable of carrier aggregation. Embodiments of the present invention can also be implemented by UEs that are not capable of carrier aggregation (in cases of dual connectivity, for example, with time-division-multiplexing (TDM) manner where the UE is using two or more cells, but can only receive/transmit on one cell at a given time).

Embodiments of the present invention can perform the following functionality. A UE can be configured with/for CA by including the CA carrier frequency(ies) on which the target cells for CA are deployed. The target cells for CA can be small/secondary cells. This configuration can be achieved by including the carrier in the measurement configuration as a "measObject," for example. "MeasObject" can be considered to be a part of the network measurement configuration sent to the UE. The "MeasObject" can indicate the carrier to the UE. The configuration can then also contain information that indicates that the carrier is an "S-Carrier" (a carrier on which secondary cells are located) and that the carrier is intended to be used for CA operation. The information that indicates that the carrier is an "S Carrier" can be indicated by a bit, for example. Additional information can include configurations for potential individual secondary cells in order to avoid configuration signaling at a point of cell change. Based on this CA configuration (S-Carrier indication), the UE can performs intra/inter-frequency measurements to detect and measure small cells on the carrier/S-Carrier. Once a small cell is detected on the indicated S-Carrier, if, for example, the cell Reference Signal Reference Power (RSRP) and/or Reference Signal Received Quality (RSRQ) exceed a given threshold (likely configured by the network), the UE can start monitoring the PDCCH of the detected secondary cell (Scell).

Embodiments of the present invention can significantly lower the CA-related signaling. Embodiments of the present invention can especially lower the CA-related signaling that is sent from a radio interface/Uu of a primary cell (Pcell) (Macro Cell), while also maintaining suitable network control. Embodiments of the present invention allow for a lighter CA functionality without any need for continuous secondary-cell management-related signaling. For example, there may not be a need for secondary-cell configuration signaling, de-configuration signaling, and/or activation signaling.

Embodiments of the present invention can also be used in conjunction with Scenario #2 from SCE. A UE can be configured with inter-frequency measurements on a carrier on which the potential secondary cells are deployed.

A configuration (e.g., a measurement configuration) can indicate that a carrier is an S-Carrier (i.e., a carrier used for secondary-cell deployment). A secondary cell is then detected by the UE. The secondary cell can be detected and measured by detecting and measuring a cell, that is, for example, if the cell measurement becomes better than some Reference-Signal-Received-Power/Reference-Signal-Received-Quality (RSRP/RSRQ) threshold, the cell is considered activated. The UE may listen to a PDCCH of a secondary cell to allow the secondary cell to reach/schedule the UE (e.g., schedule a downlink (DL)). If the network chooses to use/schedule the UE on the secondary cell, the network may directly configure the UE with the secondary-cell configuration by sending the secondary-cell configuration directly from the secondary cell to the UE. If the UE leaves the secondary-cell coverage, no report generally needs to be sent to a network.

In view of the above, embodiments of the present invention can reduce the CA-related signaling and can simplify the signaling for enabling CA as well as activation. At the same time, embodiments of the present invention can provide the above-described improvements without removing/reducing control over the network.

Embodiments of the present invention can be implemented by performing modifications to the signaling such that there is less signaling. The proposed CA configuration can be performed with existing RRC signaling along with certain modifications. The network is enabled to indicate to a UE that a configured carrier contains cells that are intended to be used for CA purposes. The network can indicate to UE that the configured carrier is to be regarded as a carrier that contains secondary cells for CA purposes (without requiring the UE to report the UE's detection of the secondary cells). Specifically, the network can use a measurement object in a measurement configuration to provide the indication.

After receiving the initial measurement configuration from the network, the UE will already know that any detected cells on the corresponding given carrier can be used in connection with CA. The UE will know that the detected cells are potential secondary cells.

As described above, in embodiments of the present invention, a detected cell on the carrier need not be explicitly configured as a secondary cell. However, if the carrier is configured as described, embodiments of the present invention will allow both the UE and the network to know that (and act as if) any cell detected on the carrier is a potential secondary cell, and, therefore, any detected cell will be regarded as a potentially configured secondary cell. Each of the detected cells may be regarded as a potentially-configured secondary cell, for example, after each cell exceeds a given threshold. As the UE will also monitor the secondary cell, the secondary cell would be "activated" as well. In embodiments of the present invention, activation can happen at the point when the UE is scheduled, e.g., when the UE is scheduled with a secondary-cell configuration (originating from the secondary cell).

So, as described above, the secondary-cell configuration can be performed without signaling between the UE and the network. For example, the configuration can be a virtual configuration. The UE can determine that the secondary cell is activated once the UE receives the secondary-cell configuration from the secondary cell. The network is informed of a configured/activated secondary cell once such a secondary cell is needed. The secondary cell can be needed for scheduling purposes, for example. This indication to the network can be done in various ways. For example, the indication can be performed, for example, through normal acknowledgement by receiving an UE acknowledgment.

As such, embodiments of the present invention can significantly reduce and maybe even completely remove secondary-cell configuration and activation delay, as specified in the specifications of the previous approaches (previous approaches described that the activation delay can be up to 34 ms).

In embodiments of the present invention, when the UE moves away from the coverage area of the secondary cell, e.g., the coverage area of the secondary/small cell, the secondary cell is de-activated and de-configured.

In view of the above, embodiments of the present invention can provide a variety of advantages. For example, embodiments of the present invention can enable instant or nearly-instant offloading via CA when a UE enters a small cell area. Embodiments of the present invention can reduce/minimize signaling. Embodiments of the present invention can reduce secondary-cell configuration from a macro cell and thus avoid excessive reporting. With embodiments of the present invention, there are less stringent requirements for CA optimization concerning when to configure small cells. With embodiments of the present invention, secondary-cell configurations can be performed from a secondary cell and not a macro cell. Embodiments of the present invention can reduce activation delays. The UE can even be ready on the secondary cell without activation delay.

Figure 2:
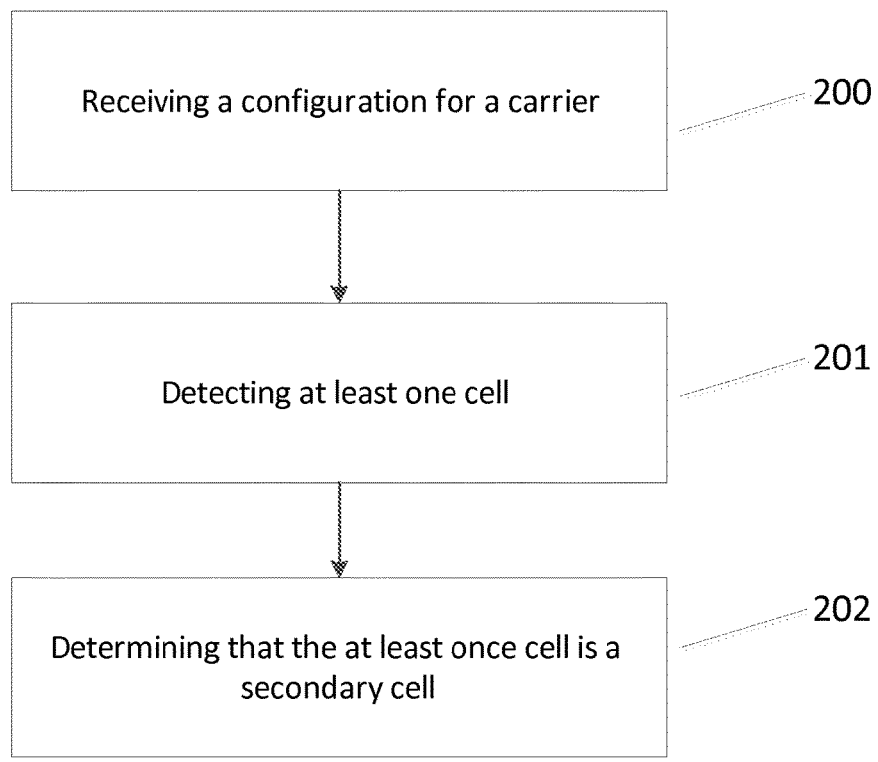
FIG. 2 illustrates a flowchart of a method in accordance with embodiments of the invention.

FIG. 2 illustrates a flowchart of a method in accordance with an embodiment of the invention. The method illustrated in FIG. 2 includes, at 200, receiving, by a user equipment, a configuration for a carrier. The carrier deploys at least one cell to be used for carrier aggregation. The method includes, at 201, detecting the at least one cell. The method includes, at 202, determining that the at least one cell is a secondary cell for carrier aggregation based on the at least one cell being detected.

Figure 3:
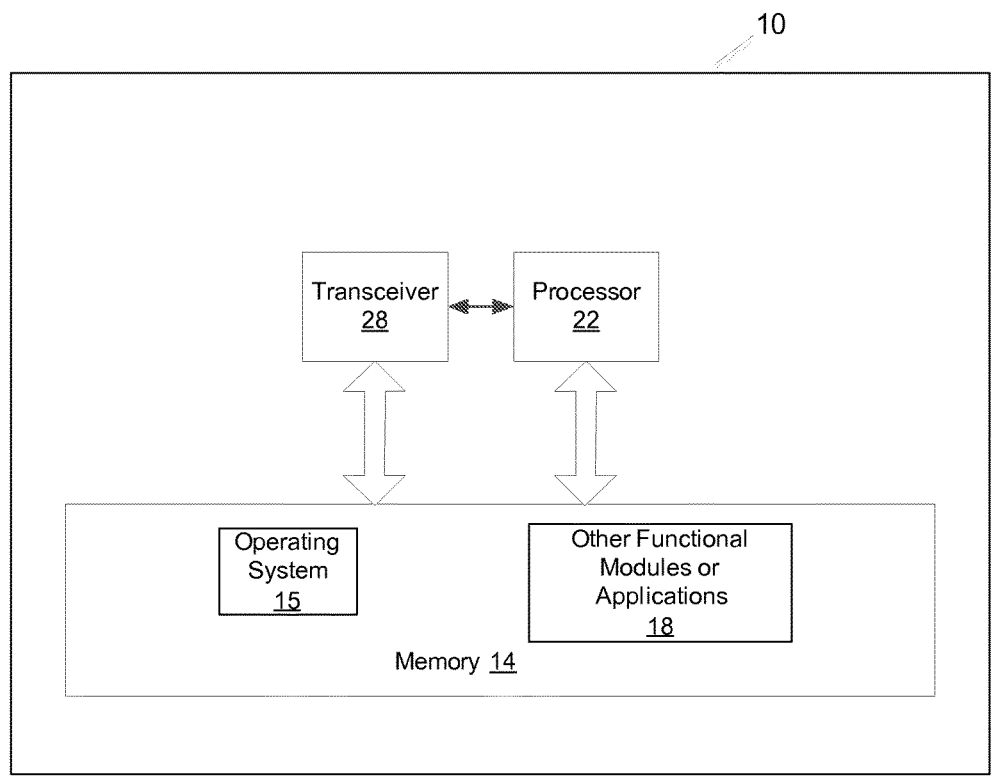
FIG. 3 illustrates an apparatus in accordance with embodiments of the invention.

FIG. 3 illustrates an apparatus in accordance with an embodiment of the invention. In one embodiment, apparatus 10 can be a base station/eNB. In another embodiment, apparatus 10 can be a user equipment. Apparatus 10 can include a processor 22 for processing information and executing instructions or operations. Processor 22 can be any type of general or specific purpose processor. While a single processor 22 is shown in FIG. 3, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 4:
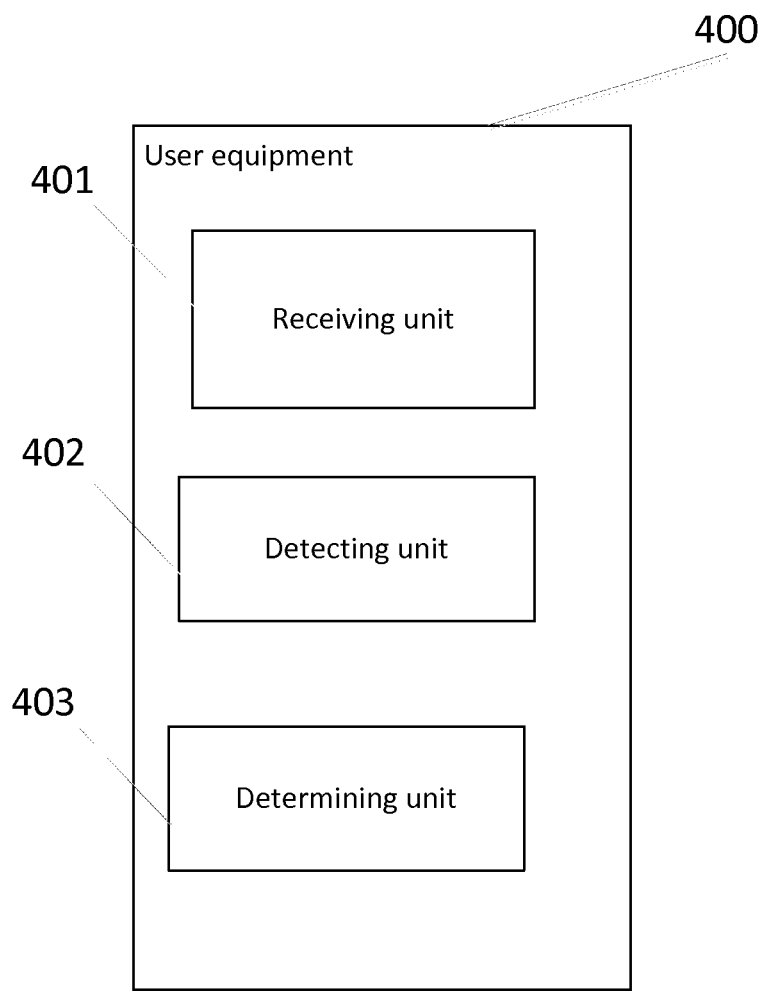
FIG. 4 illustrates an apparatus in accordance with embodiments of the invention.

FIG. 4 illustrates an apparatus in accordance with another embodiment. Apparatus 400 can be a user equipment, for example. Apparatus 400 can include a receiving unit 401 that receives, by the apparatus 400, a configuration with a carrier. The carrier deploys at least one cell to be used for carrier aggregation. Apparatus 400 can also include a detecting unit 402 that detects the at least one cell. Apparatus 400 can also include a determining unit 403 that determines that the at least one cell is a secondary cell for carrier aggregation based on the at least one cell being detected.

Figure 5:
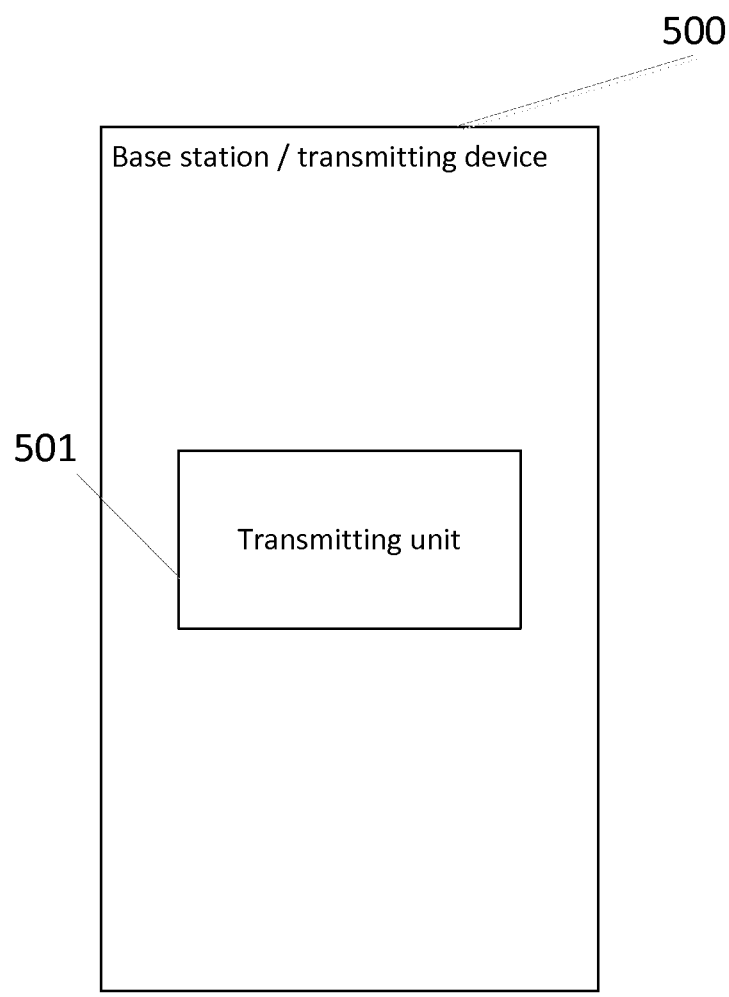
FIG. 5 illustrates an apparatus in accordance with another embodiment.

FIG. 5 illustrates an apparatus in accordance with another embodiment. Apparatus 500 can be a base station and/or any other type of transmitting device within a network. Apparatus 500 can include a transmitting unit 501 that transmits a configuration for a carrier to a user equipment. The carrier can deploy at least one cell to be used for carrier aggregation. The at least one cell is determined to be a secondary cell for carrier aggregation based on the at least one cell being detected by the user equipment.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   receiving, by a user equipment, a configuration for a carrier, wherein the carrier deploys at least one cell to be used for carrier aggregation in a network;
   detecting the at least one cell; and
   determining the at least one cell to be an activated secondary cell for carrier aggregation when the at least one cell is detected and without reporting the detected at least one cell to the network,
   wherein the secondary cell is determined to be activated when a measurement of the secondary cell exceeds a reference-signal-received-power or a reference-signal-received quality threshold.

2. The method according to claim 1, wherein detecting the at least one cell comprises detecting at least one small cell.

3. The method according to claim 1, further comprising monitoring a physical-downlink-control channel of the at least one cell if the at least one cell is detected.

4. The method according to claim 3, wherein the monitoring the physical-downlink-control channel comprises monitoring the physical-downlink-control-channel if a cell-reference-signal-reference power or the reference-signal-received-quality exceeds a given threshold.

5. The method according to claim 1, further comprising receiving, by the user equipment, an indication that the configuration for the carrier is for a secondary carrier.

6. The method according to claim 5, wherein the indication is received in a measurement object in a measurement configuration.

7. An apparatus, comprising:
at least one processor; and
at least one memory including computer program code,
the at least one memory and the computer program code configured, with the at least one processor, to cause the apparatus at least to
receive, by the apparatus, a configuration for a carrier, wherein the carrier deploys at least one cell to be used for carrier aggregation in a network;
detect the at least one cell; and
determine the at least one cell to be an activated secondary cell for carrier aggregation when the at least one cell is detected and without reporting the detected at least one cell to the network,
wherein the secondary cell is determined to be activated when a measurement of the secondary cell exceeds a reference-signal-received-power or a reference-signal-received quality threshold.

8. The apparatus according to claim 7, wherein detecting the at least one cell comprises detecting at least one small cell.

9. The apparatus according to claim 7, wherein the apparatus is further caused to monitor a physical-downlink-control channel of the at least one cell if the at least one cell is detected.

10. The apparatus according to claim 9, wherein the monitoring the physical-downlink-control channel comprises monitoring the physical-downlink-control-channel if a cell-reference-signal-reference power or the reference-signal-received-quality exceeds a given threshold.

11. The apparatus according to claim 7, wherein the apparatus is further caused to receive an indication that the configuration for the carrier is for a secondary carrier.

12. The apparatus according to claim 11, wherein the indication is received in a measurement object in a measurement configuration.

13. An apparatus, comprising:
at least one processor; and
at least one memory including computer program code,
the at least one memory and the computer program code configured, with the at least one processor, to cause the apparatus at least to
transmit a configuration for a carrier to a user equipment, wherein the carrier deploys at least one cell to be used for carrier aggregation, and the at least one cell is determined to be an activated secondary cell for carrier aggregation when the at least one cell is detected by the user equipment without receiving a report of the activated secondary cell,
wherein the secondary cell is determined to be activated when a measurement of the secondary cell exceeds a reference-signal-received-power or a reference-signal-received quality threshold.

14. The apparatus according to claim 13, wherein the apparatus is further caused to transmit, to the user equipment, an indication that the configuration for the carrier is for a secondary carrier.

15. The apparatus according to claim 14, wherein the indication is transmitted in a measurement object in a measurement configuration.

* * * * *